United States Patent
Litvin et al.

(10) Patent No.: US 10,079,469 B1
(45) Date of Patent: Sep. 18, 2018

(54) CONTROLLABLE LASER AMPLIFIER APPARATUS AND METHOD

(71) Applicant: CSIR, Pretoria (ZA)

(72) Inventors: Ihar Anatolievich Litvin, Pretoria (ZA); Gary Rees King, Pretoria (ZA)

(73) Assignee: CSIR, Pretoria (ZA)

( * ) Notice: Subject to any disclaimer, the term of this patent is extended or adjusted under 35 U.S.C. 154(b) by 0 days.

(21) Appl. No.: 15/835,754

(22) Filed: Dec. 8, 2017

(51) Int. Cl.
| | |
|---|---|
| *H01S 3/08* | (2006.01) |
| *H01S 3/23* | (2006.01) |
| *H01S 3/10* | (2006.01) |
| *H01S 3/094* | (2006.01) |
| *H01S 3/00* | (2006.01) |
| *H01S 3/0941* | (2006.01) |
| *H01S 3/0915* | (2006.01) |
| *H01S 3/16* | (2006.01) |

(52) U.S. Cl.
CPC ............ *H01S 3/2308* (2013.01); *H01S 3/005* (2013.01); *H01S 3/0071* (2013.01); *H01S 3/094003* (2013.01); *H01S 3/10007* (2013.01); *H01S 3/094* (2013.01); *H01S 3/0915* (2013.01); *H01S 3/0941* (2013.01); *H01S 3/16* (2013.01); *H01S 3/1643* (2013.01); *H01S 2301/20* (2013.01); *H01S 2301/206* (2013.01)

(58) Field of Classification Search
CPC ...... H01S 3/2308; H01S 3/0071; H01S 3/005; H01S 3/094003; H01S 3/10007; H01S 3/1643; H01S 3/16; H01S 3/0941; H01S 3/0915; H01S 3/094; H01S 2301/20; H01S 2301/206
See application file for complete search history.

(56) References Cited

U.S. PATENT DOCUMENTS

| | | | | |
|---|---|---|---|---|
| 2004/0022280 | A1* | 2/2004 | Lai | H01S 3/0057 372/5 |
| 2006/0239304 | A1* | 10/2006 | Yin | H01S 3/09415 372/19 |
| 2006/0262815 | A1* | 11/2006 | Klimov | H01S 3/09415 372/18 |

(Continued)

OTHER PUBLICATIONS

Romero et al., "Lossless laser beam shaping" J Opt Soc Am, 1996, A 13(4), pp. 751-760.

(Continued)

*Primary Examiner* — Kinam Park
(74) *Attorney, Agent, or Firm* — Stradley Ronon Stevens & Young, LLP (57) ABSTRACT

A controllable laser amplifier apparatus includes a gain medium and a seed laser emitter configured to generate a seed laser beam, the seed laser emitter directed toward the gain medium. The apparatus has at least two pump laser emitters configured to generate respective pump laser beams, wherein the pump laser emitters are adjustable such that respective intensities of the pump laser beams are adjustable relative to one another and/or relative to the seed laser pump, wherein the pump laser emitters are arranged such that at least one of the pump laser beams is laterally offset relative to the seed laser beam, and wherein the pump laser beams are configured to effect a gain profile in the gain medium. An output laser beam from the gain medium is a function of at least the gain profile and the seed laser beam.

15 Claims, 9 Drawing Sheets

(56) References Cited

U.S. PATENT DOCUMENTS

| | | | | |
|---|---|---|---|---|
| 2008/0037597 A1* | 2/2008 | Mason | .................. | H01S 3/0602 372/13 |
| 2008/0181266 A1* | 7/2008 | Deladurantaye | .... | H01S 3/06758 372/25 |
| 2016/0316551 A1* | 10/2016 | Kurosawa | ............. | H01S 3/2232 |

OTHER PUBLICATIONS

Belanger et al., "Optical resonators using graded-phase mirrors" Opt Lett, 1991, 16(14), pp. 1057-1059.

Leger et al., "Diffractive optical element for mode shaping of a Nd:YAG laser" Opt Lett, 1994, 19(2), pp. 108-110.

Zhirnov et al., "Laser beam profiling: experimental study of its influence on single-track formation by selective laser melting" Mechanics & Industry, 2015, 16, pp. 709.

Hansen et al., "Beam shaping to control of weldpool size in width and depth" Proceedings of LANE, 2014, 56, pp. 167-476.

Burger et al., "Implementation of a spatial light modulator for intracavity beam shaping" J Opt, 2015, 17, 015604.

Ngcobo et al., "A digital laser for on-demand laser modes" Nat Commun, 2013, 4, 2289.

Litvin et al., "Beam shaping laser with controllable gain" Appl Phys B, 2017, 123.

\* cited by examiner

CONTROLLABLE LASER AMPLIFIER APPARATUS AND METHOD

FIELD OF INVENTION

This invention relates broadly to optics and lasers, and more specifically to a controllable laser amplifier apparatus and method which can be used to amplify and shape a laser beam.

BACKGROUND OF INVENTION

The Applicant notes that laser beams with a non-Gaussian intensity profile can be advantageous in the fields of laser materials processing, medicine, and others. Methods of producing such non-Gaussian beams can be divided into two classes, namely extra-cavity [1-2] and intra-cavity [3-4] beam shaping.

In laser-based applications such as additive manufacturing, laser surface engineering, biology, and medicine involving time evolving processes, it may be important to get a controllable intensity shape of laser beam with low response time [5-6].

Recently, an intra-cavity Spatial Light Modulator (SLM) was successfully implemented to produce a controllable beam shaping inside a laser cavity [7]. However, this technique has some limitations with scaling up of output power due to low damage thresholds of SLMs.

Additionally, the SLM has a relatively long response time that limits implementation with high speed applications. Moreover, variation of reflectivity for different grey scale levels (phase) of intra cavity SLM creates additional problems for controllable intra-cavity beam shaping [8].

Another option for intra-cavity beam shaping is to manipulate a gain profile in a laser crystal to perform beam shaping to control the weighting of the desired mode in the output beam. This technique allows simultaneous and controllable variation of both the output power and the transverse intensity distribution of laser beam [9]. A disadvantage of this technique is the limitation for the spatial shape intensities of output beam by laser cavity geometry.

The Applicant desires a controllable laser amplifier which can also perform beam shaping. The Applicant believes that such a laser amplifier would be advantageous if it had high-power capabilities and tolerance to incoherent laser beams.

SUMMARY OF INVENTION

The invention provides a controllable laser amplifier apparatus which includes:
a gain medium;
a seed laser emitter configured to generate a seed laser beam, the seed laser emitter directed toward the gain medium; and
at least two pump laser emitters configured to generate respective pump laser beams, wherein the pump laser emitters are adjustable such that respective intensities of the pump laser beams are adjustable relative to one another and/or relative to the seed laser pump, wherein the pump laser emitters are arranged such that at least one of the pump laser beams is laterally offset relative to, or not co-axial with, the seed laser beam, and wherein the pump laser beams are configured to effect a gain profile in the gain medium, the gain profile being a function of the arrangement of the pump laser emitters and the intensity of the pump laser beams, wherein an output laser beam from the gain medium is a function of at least the gain profile and the seed laser beam.

It should be noted that a shape or intensity profile of the output laser beam may be different from that of the seed laser beam. Accordingly, the laser amplifier apparatus may also be a beam shaping apparatus. The intensity profile of the output laser beam may be controllable by adjusting the pump laser emitters.

There may be more than two pump laser emitters.

The pump laser emitters may be laser diodes.

The seed laser emitter need not necessarily generate the seed laser beam to be coherent.

Each one of the pump laser emitters may be configured to generate a single pump laser beam.

All of the pump laser emitters may be arranged such that all of the pump laser beams are laterally offset relative to, or not co-axial with, the seed laser beam. Instead, at least one of the pump laser beams may be co-axial with the seed laser beam, while at least one of the other pump laser beams may be laterally offset relative to, or not co-axial with, the seed laser beam.

The laser amplifier apparatus may include an electronic controller configured to adjust at least the intensities of the pump laser beams. This may be achieved by controlling an electrical input (e.g., a current) supplied to the pump laser emitters.

The electronic controller may be operable to control the electrical input supplied to the pump laser emitters in micro- or nano-second time periods, thus realising relatively fast control. The controller may change the electrical input to the pump laser emitters as fast or faster than the pump laser emitters can react.

The gain medium may be a crystalline or ceramic gain medium.

The gain medium may be a slab, bar, or elongate structure. The seed laser beam may be directed to one side of the gain medium, while the pump laser beams may be directed to an opposite side of the gain medium. The amplified laser beam output may emerge from an opposite side of the gain medium to that which the seed laser beam is directed.

There may be various configurations or combinations of the pump laser emitters. Example configurations include:
Two pump laser emitters arranged such that the pump laser beams are laterally offset each side of the seed laser beam.
A plurality (e.g., 5-20 or more) of laser emitters arranged such that the pump laser beams are in an annular line around the seed laser beam.
Four pump laser emitters arranged such that the pump laser beams are in a square formation and are equiangularly spaced by (e.g., by 90°) around the seed laser beam.
A plurality (e.g., 6-10 or more) of laser emitters arranged such that the pump laser beams are in two linear rows each side of the seed laser beam.

Different configurations of pump laser emitters may be conceived which are not described in the examples but which nonetheless fall within the scope of the laser amplifier apparatus defined above.

The invention extends to a method of operating a controllable laser amplifier apparatus, the method including:
generating, by a seed laser emitter, a seed laser beam and directing the seed laser beam toward a gain medium;
generating, by at least two pump laser emitters, respective pump laser beams, wherein the pump laser emitters are arranged such that at least one of the pump laser beams is laterally offset relative to, or not co-axial with, the seed laser beam, adjusting intensities of the pump laser emitters relative to one another and/or relative to the seed laser pump, wherein the pump laser beams are configured to effect a gain profile in the gain medium, the gain profile being a function of the arrangement of the pump laser emitters and the intensity of the pump laser beams, and wherein an output laser beam from the gain medium is a function of at least the gain profile and the seed laser beam.

BRIEF DESCRIPTION OF DRAWINGS

The invention will now be further described, by way of example, with reference to the accompanying diagrammatic drawings.

In the drawings.

DETAILED DESCRIPTION OF EXAMPLE EMBODIMENT

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

Figure 1:
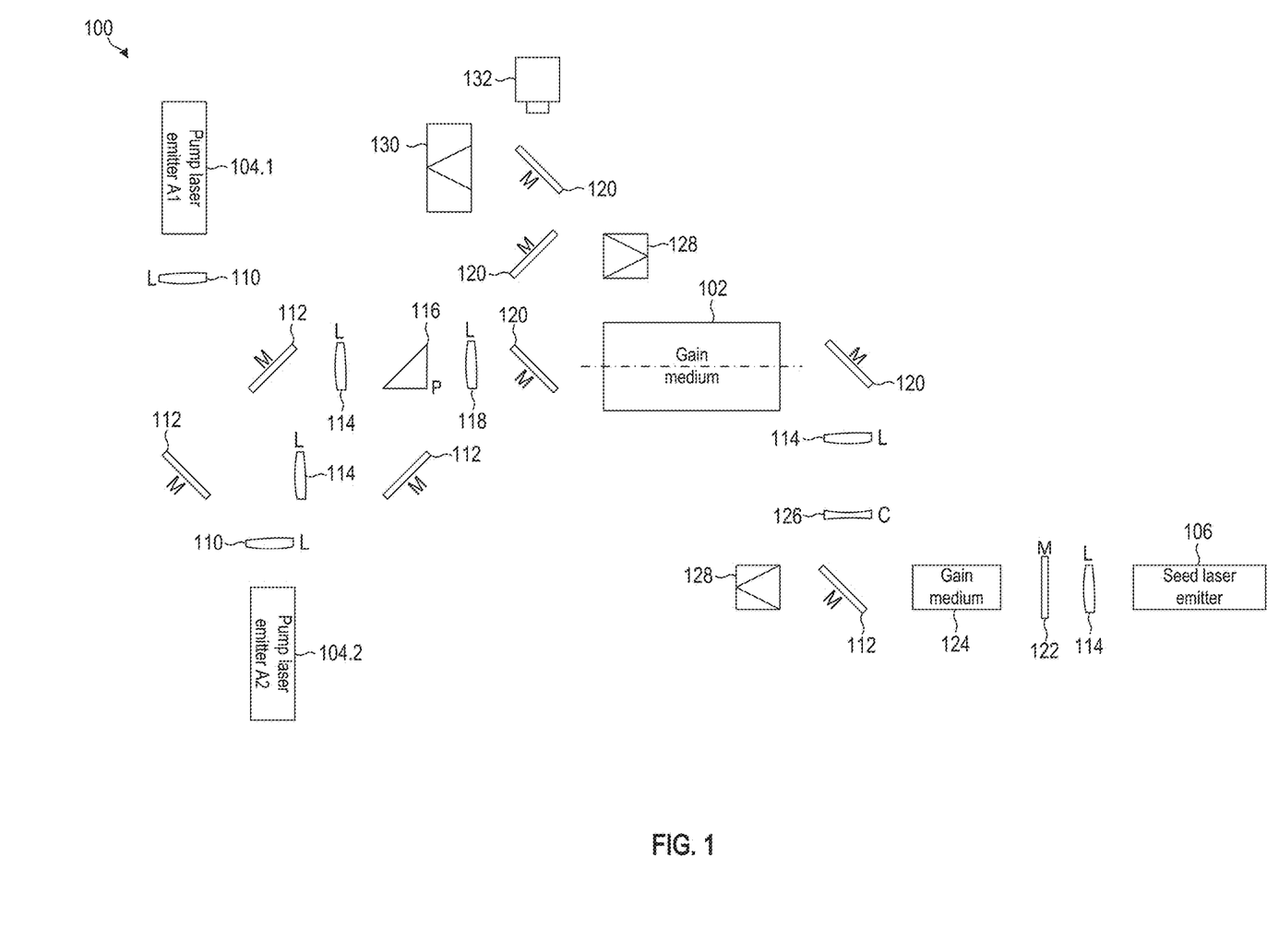
FIG. 1 shows a schematic view of a controllable laser amplifier apparatus in accordance with the invention.
Figure 2:
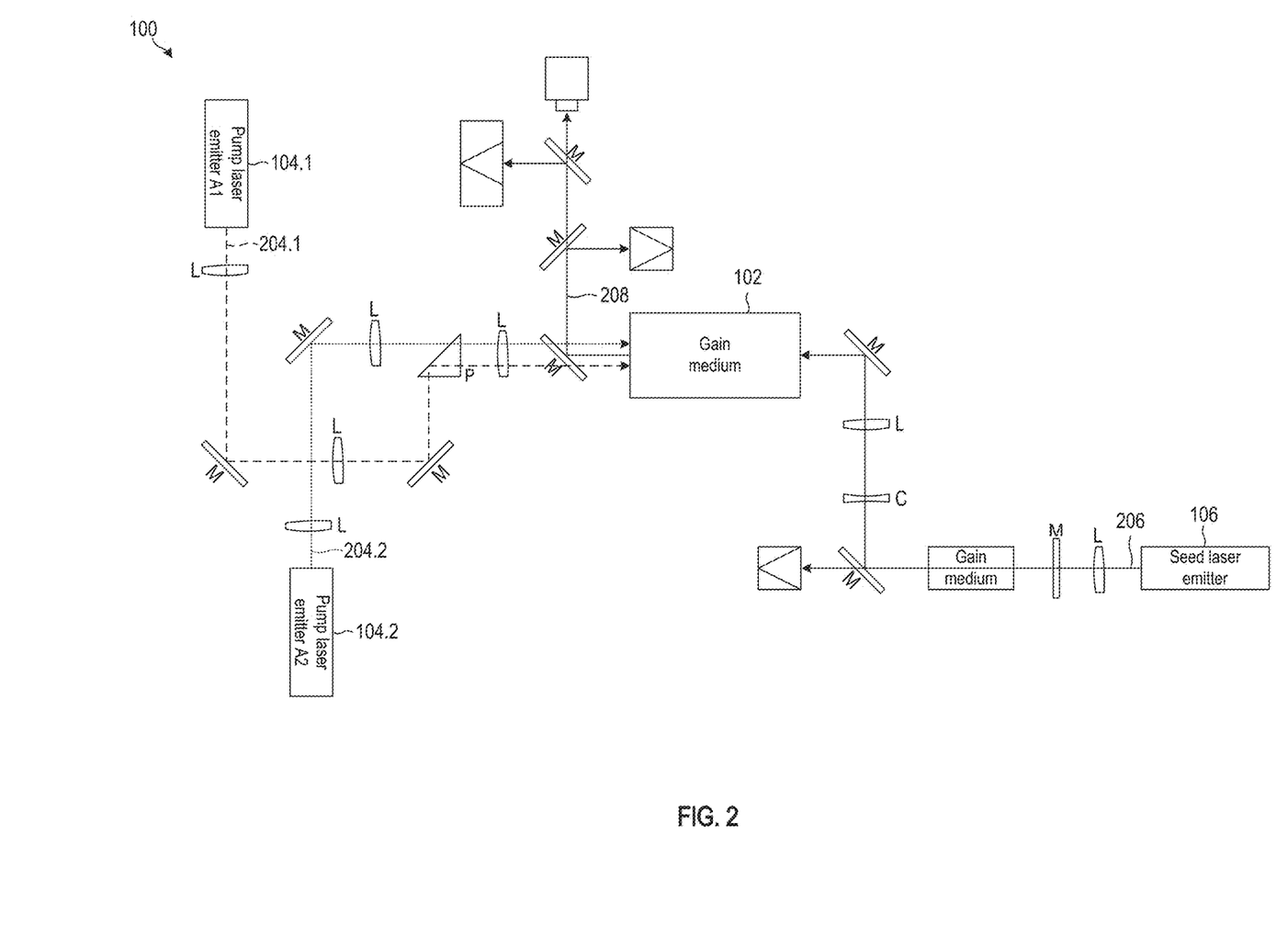
FIG. 2 shows a schematic view of the laser amplifier apparatus of FIG. 1 with schematic laser lines.

FIGS. 1-2 illustrate an example of a controllable laser amplifier apparatus 100 in accordance with the invention. The apparatus 100 has two pump laser emitters 104.1-104.2, designated as pump laser emitter A1 104.1 and pump laser emitter A2 104.2, collectively referenced by numeral 104. In this example, there are only two pump laser emitters 104, but in different examples, there could be more than two.

In FIGS. 1-2, the letter L generally refers to a lens, the letter M to a mirror, the letter P to a prism and the letter C to a coupler. The pump laser emitter A1 104.1 emits a pump laser beam 204.1 which is directed towards a gain medium 102. The pump laser beam 204.2 is directed to the gain medium 102 via a collimating lens 110, a silver fold mirror 112, a focusing lens 114, another silver fold mirror 112, a prism (P) 116, and a pump focusing lens 118. Similarly, the pump laser emitter A2 104.2 emits a pump laser beam 204.2 which is directed towards the gain medium 102 via a collimating lens 110, a silver fold mirror 112, a focusing lens 114, and the pump focusing lens 118. The pump laser beams 204.1, 204.2 are collectively referenced by numeral 204.

Many of the components 110-118 are generic and may be added, modified, removed or substituted depending on a desired setup of the laser amplifier apparatus 100. The Applicant notes that the setup in FIGS. 1-2 was a proof of concept configuration and more streamlined configurations for production versions of the laser amplifier apparatus 100 are envisaged, which might not necessarily include all components 110-128.

The laser amplifier apparatus 100 has a seed laser emitter 106 which is operable to produce a seed laser beam 206. It will be noted that the laser beams 204, 206 are illustrated in FIG. 2 for clarity. The seed laser beam 206 is represented by a solid line, the pump laser beam 204.1 by a dashed line and the pump laser beam 204.2 by a dotted line. The seed laser beam 206 is directed via a focussing lens 114, a special mirror 112 (which is Highly Reflective (HR) at 1064 nm and Anti-Reflective (AR) at 793 nm), a pre-amplifier gain medium 124 (which may be Nd:YAG crystal), a silver fold mirror 112, an output coupler 126, a focussing lens 114, and a mirror 120 (HR at 1064 nm).

An amplified output laser beam 208 emerges from the gain medium 102. The output laser beam 208 is directed via a mirror 120, where it may be split off via another mirror 120 to a beam dump 128.

Figure 3:
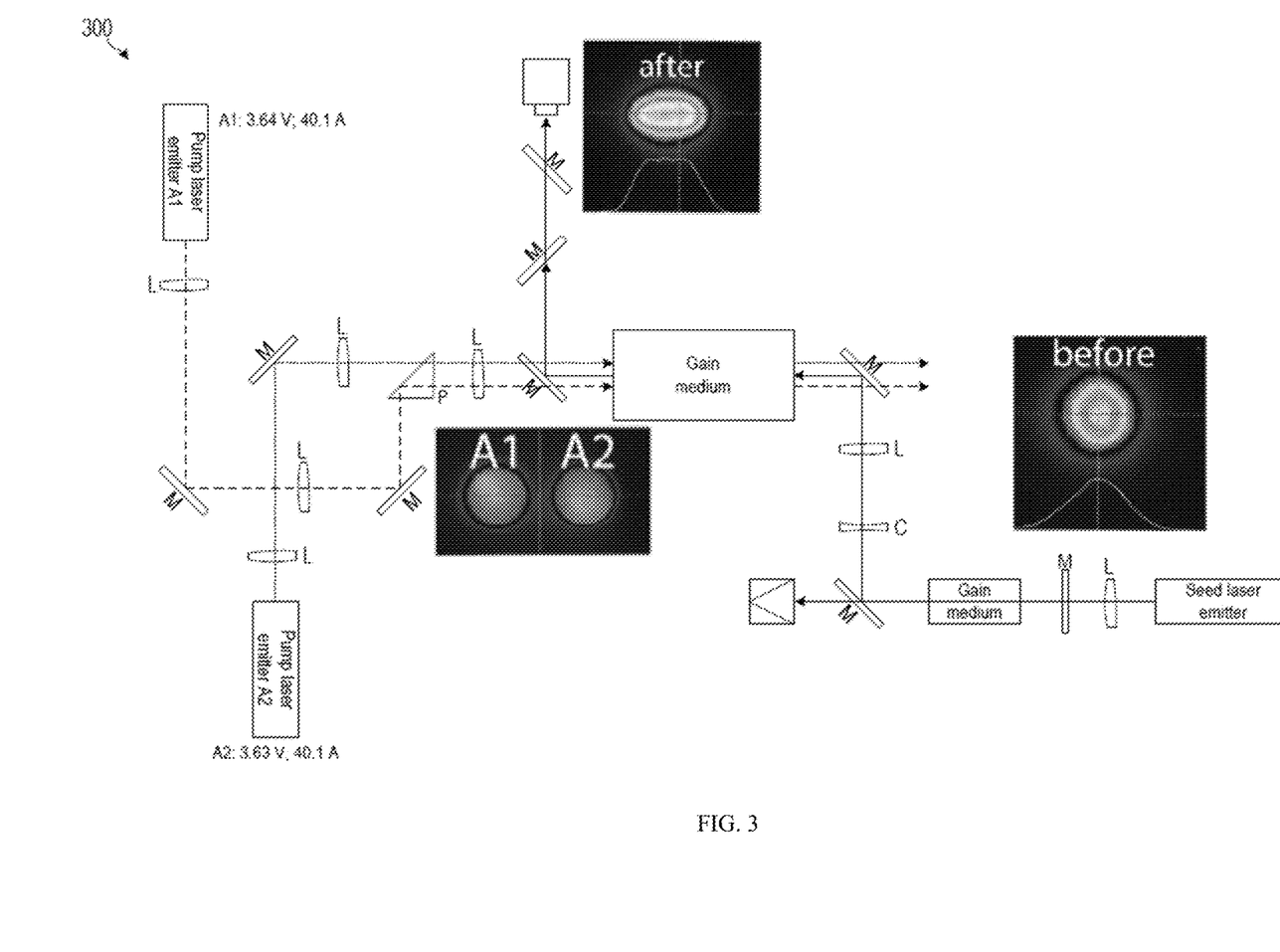
FIG. 3 shows a further schematic view of the laser amplifier apparatus of FIG. 1.

FIG. 3 illustrates a further schematic view of a laser amplifier apparatus 300, with beam intensity profiles, corresponding to the laser apparatus 100 of FIG. 1.

Figure 4:
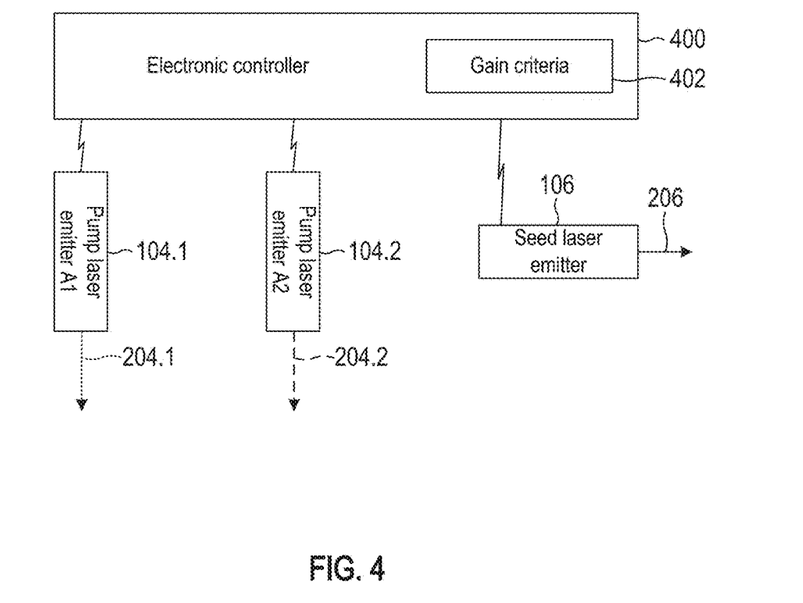
FIG. 4 shows a schematic view of an electronic controller for use with the laser amplifier apparatus of FIG. 1.

FIG. 4 shows an electronic controller 400 which forms part of the laser amplifier apparatus 100. Each of the pump laser emitters 104 are controlled electronically by the electronic controller 106. In this example, the seed laser emitter 106 is also controlled electronically by the electronic controller 106. The electronic controller 400 may be in the form of a computer processor. The electronic controller 400 includes gain criteria 402 which may be in the form of pre-programmed computer instructions. The electronic controller 400 may also be configured to receive a user input indicative of the gain criteria. The gain criteria 402 may be adjusted or configured for a specific application to which the laser amplifier apparatus 100 is applied.

The electronic controller 400 is configured to control the laser beams (that is, the pump laser beams 204 and the seed laser beam 206). This may be done by varying a current supplied to the laser emitters 104, 106. The current may be varied in accordance with the gain criteria 402. The gain criteria 402 may prescribe a desired shape and/or intensity of the output laser beam 208. The gain criteria 402 may direct the input electrical currents which should be provided to the pump laser emitters 104 and/or the seed laser emitter 106 to realise the prescribed shape and/or intensity of the output laser beam 208. The gain criteria 402 may provide that the output laser beam 208 be time-varying. The gain criteria 402 may provide how the input electrical currents should be varied to realise the time-varying output laser beam 208.

Figure 5:
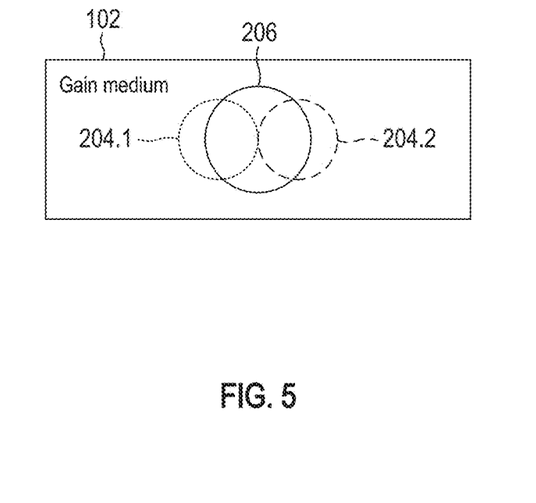
FIG. 5 shows a schematic view of a seed laser beam and pump laser beams at a gain medium in the laser amplifier apparatus of FIG. 1.

FIG. 5 illustrates a side view of the gain medium 102. The seed laser beam 206 is directed roughly centrally towards the gain medium 102. The pump laser beams 204 are directed towards the gain medium 102 such that they are laterally offset relative to (that is, not co-axial with) the seed laser beam 206. In this example, each pump laser beam 204 is offset from the seed laser beam 206, with one pump laser beam 204.1 being on one side of the seed laser beam 206 and the other pump laser beam 204.2 being on the other side of the seed laser beam 206.

The arrangement of the pump laser beams 204 creates a non-uniform gain profile across the gain medium 102. This non-uniform gain profile serves to amplify some parts of the seed laser beam 206 more than others, which in turn shapes an output laser beam 208 which emerges from the gain medium 102. (The relative sizes of the beams 204, 206 in FIG. 5 is arbitrary and is for illustrative purposes only.)

The gain profile created in the gain medium 102 can be manipulated by controlling an intensity of the seed laser beams 204 relative to each other and relative to the pump laser beam 206.

Figure 6:
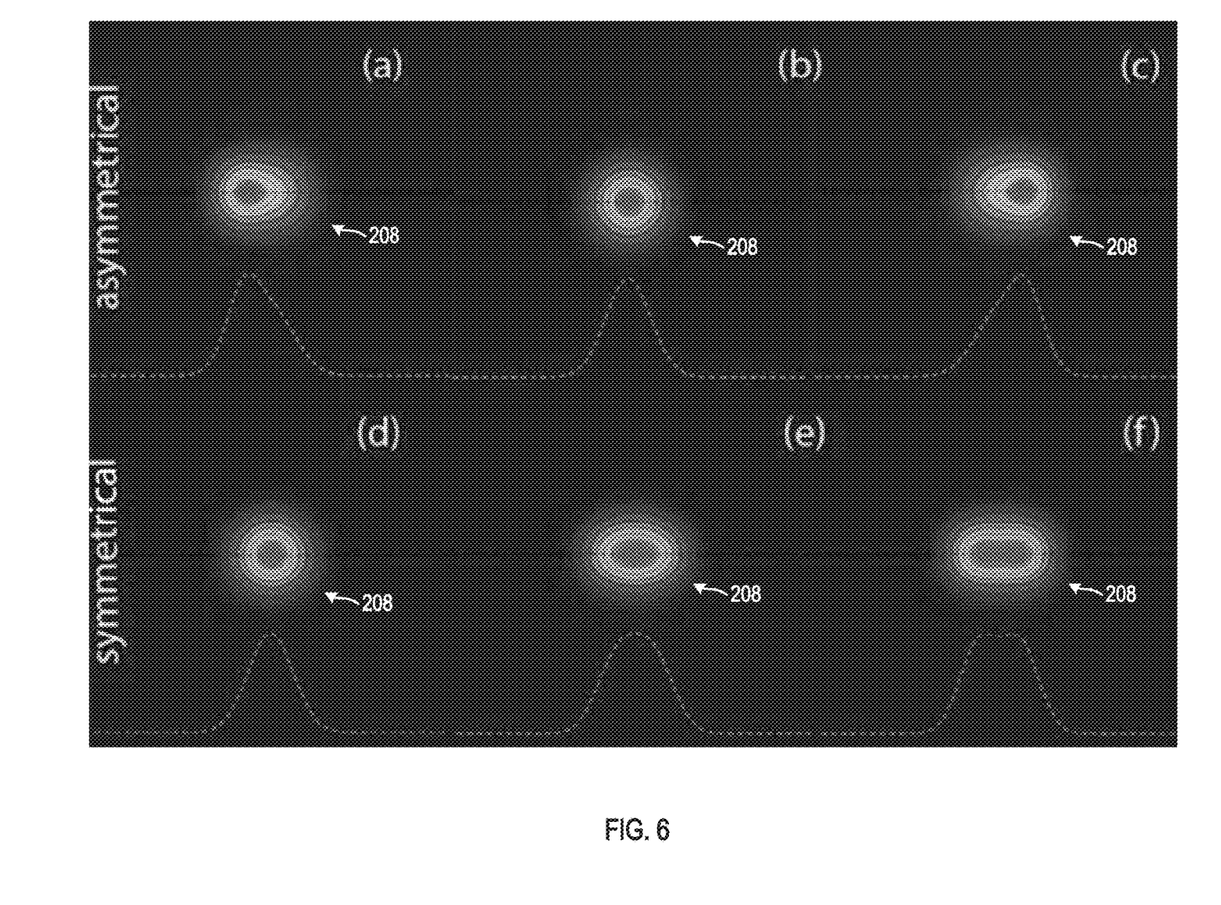
FIG. 6 shows various theoretical intensity profiles of an output laser beam of the laser amplifier apparatus of FIG. 1.

FIG. 6 illustrates theoretical examples of output laser beams 208 caused by different combinations of relative intensities of the seed laser beams 204 and the pump laser beam 206. In FIG. 6:
(a) The pump laser beam A1 204.1 is more intense than the other pump laser beam A2 204.2—the output laser beam 208 is offset towards the side of the pump laser beam A1 204.1;
(b) The pump laser beams 204 have roughly the same intensity—the output laser beam 208 is symmetrical;
(c) The pump laser beam A1 204.1 is less intense than the other pump laser beam A2 204.2—the output laser beam 208 is offset towards the side of the pump laser beam A2 204.2;
(d) The pump laser beams 204 are less intense than the seed laser beam 206—the output laser beam has a profile weighted towards the seed laser beam 206;
(e) The pump laser beams 204 are of a similar intensity to the seed laser beam 206—the output laser beam is an average combination of pump laser beams 204 and seed laser beam 206; and
(f) The pump laser beams 204 are more intense than the seed laser beam 206—the output laser beam has a profile weighted towards the pump laser beams 206.

Figure 7:
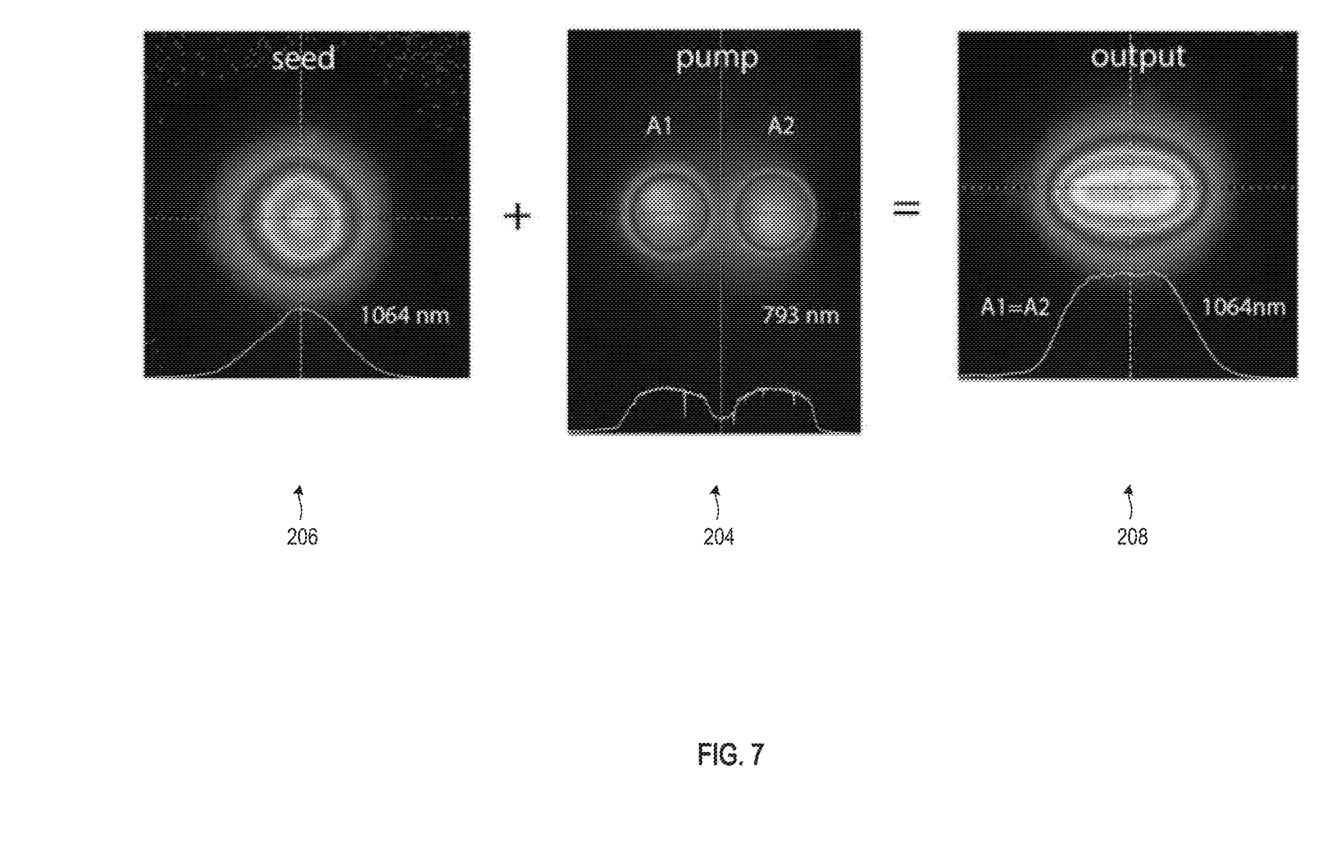
FIG. 7 shows example intensity profiles of a seed laser beam, pump laser beams, and an output laser beam of the laser amplifier apparatus of FIG. 1.

FIG. 7 illustrates actual measured inputs and outputs from the laser amplifier apparatus 100. The gain medium 102 is a (0.6%) Nd:YAG ceramic crystal with constant doping concentrations. The pump laser emitters 204 are two laser diodes with separated power controllers (but which may be controlled by a common electronic controller). The respective pump laser beams 204 are designated as A1 and A2 in FIG. 7. The pump laser beams A1 204.1, A2 204.2 are controllable and give rise to a non-uniform transverse gain profile which results in varying amplification at different transverse position. A spatial intensity distribution of the gain in the gain medium 102 and pump power adjustment enabled an uneven and controllable amplification of the seed laser beam 206 which resulted in desired beam shape of the output laser beam 208.

The effect of the laser amplifier apparatus 100 as illustrated in FIG. 7 is that a Gaussian seed laser beam 206 has been shaped into a flattop beam 208 in one transverse coordinate by the two offset pump laser beams 204.

More specific details of the experimental setup are as follows. The seed laser emitter 106 consists of a Jenoptik fibre coupled laser diode emitting a pump laser beam at 793 nm. This is focused, using the converging lens 114 into the ceramic Nd:YAG (0.4%) gain medium 124. A resonator, with high reflecting mirror 122 for the laser wavelength at 1064 nm and anti-reflection coating for the 793 nm pump laser beam 206 on one side, and an 80% partially reflecting output coupler 126 with a 300 mm radius of curvature, was built around the gain medium 124. A fold mirror 120 having a high transmission for the 793 nm wavelength and a high reflectance for 1064 nm light folds the pump laser beam 206 through 90°. Any excess light from the pump laser beam 206 can be dumped into the beam dump 128. Only the 1064 nm laser light from the pump laser beam 206 is allowed to propagate to the rest of the amplifier 100.

The emerging Gaussian pump laser beam 206 is directed through the focusing (diverging) lens 114 to form a beam of the correct diameter inside the amplifier material, and is again reflected through 90° by the mirror 120 and into the main gain medium 102. Once the output laser beam 208 emerges from the gain medium 102 it is reflected through 90° with a 1064 nm high reflector mirror 120. The mirror 120 also allows 793 nm light to pass through un-attenuated, to accommodate the two pump laser beams 204. The 1064 nm wavelength output laser beam 208 is then guided to a diagnostic set up including the 100 W power reader head and the camera 132.

The pump laser emitters 204 are Jenoptik fibre coupled laser diodes and are placed at approximately 90° to a longitudinal axis of the gain medium 102, collimated with lenses 110 and then folded through 90° with two mirrors 112 towards the gain medium 102.

A standard 1 inch (2.54 cm) diameter optical fold mirror creates a large angle at which the two independent pump laser beams 204 enter the gain medium 102. One of the beams 204.2 is folded to reduce this angle as much as possible.

The pump laser emitter A2 104.2 is aimed indirectly through two lenses 114, 118 that focussed the pump laser beam 204.2 to a point inside the gain medium 102. The pump laser emitter A1 204.1 is aimed through the first focussing lens 114, reflected with a mirror 112, into a small high reflecting folding prism 116 coated for the wavelength of the pump laser beam 204.2, through the second focussing lens 118 and into the gain medium 102. By moving the first focussing lens 114 the first pump laser beam 204.1 was focussed to the same position in the gain medium 102 as the second pump laser beam 204.2. The first pump laser beam 204.1 is manipulated using the mirror 112 just before the prism 116 and the prism 116 itself to achieve a correct gap (that is, that offset spacing) between the two pump laser beams 204.

The output laser beam 208 is reflected away from the longitudinal axis of the gain medium 102 to an attenuating mirror with 99.8% reflectivity onto a Gentec 100 W power reader head 130. The remaining output laser beam 208 enters a Pyrocam III Beam diagnostic camera 132. All the optical lenses 110, 114 118, mirrors 112, 120, 122 and partial reflectors 120 used in this experiment are supplied by Latertec™.

Figure 8:
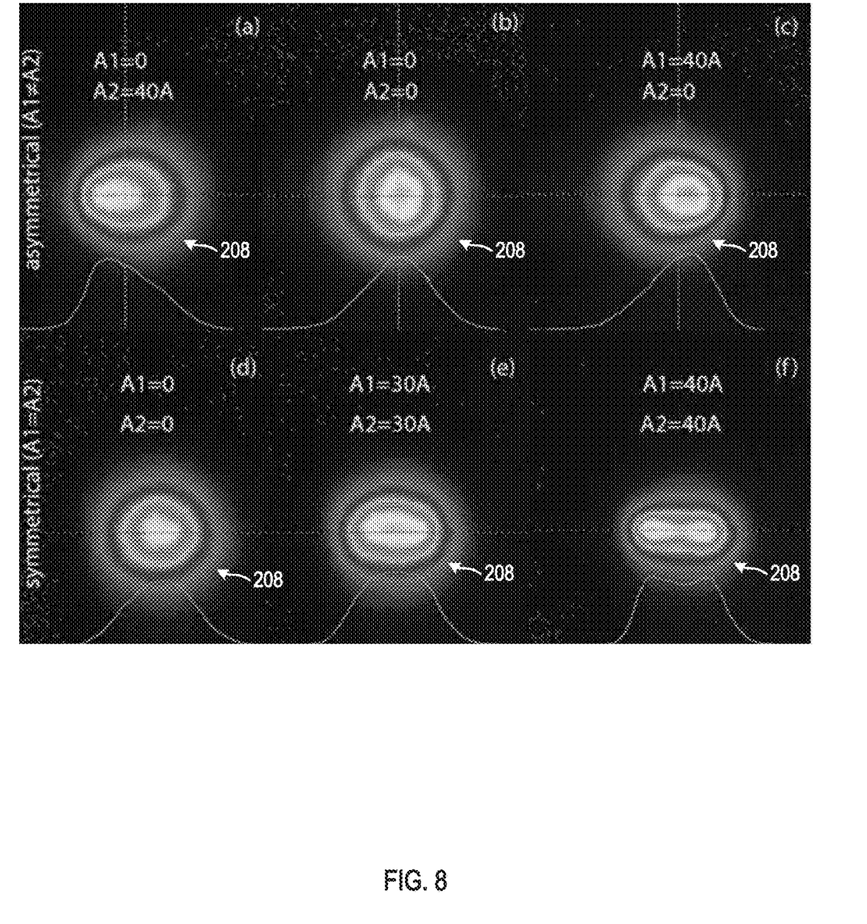
FIG. 8 (panels a, b, c, d, e and f) show various measured intensity profiles of an output laser beam of the laser amplifier apparatus of FIG. 1, corresponding to the theoretical intensity profiles of FIG. 6.

FIG. 8 (panels a, b, c, d, e and f) illustrate actual measured results, corresponding to the theoretical results illustrated in FIG. 6. From experiments performed, the controller 400 (operated with a manual user input) was used to control the intensity of the pump laser beams 204 to control the gain profile, thereby to shape the output laser beam 208. A current applied to the respective pump laser emitter A1 204.1 and pump laser emitter A2 204.2 is illustrated. The output laser beam 208 may have various profiles including Gaussian (FIG. 8, panels b and d), flattop beam (FIG. 8, panels e and f) and asymmetrical (FIG. 8, panels a and c).

Figure 9:
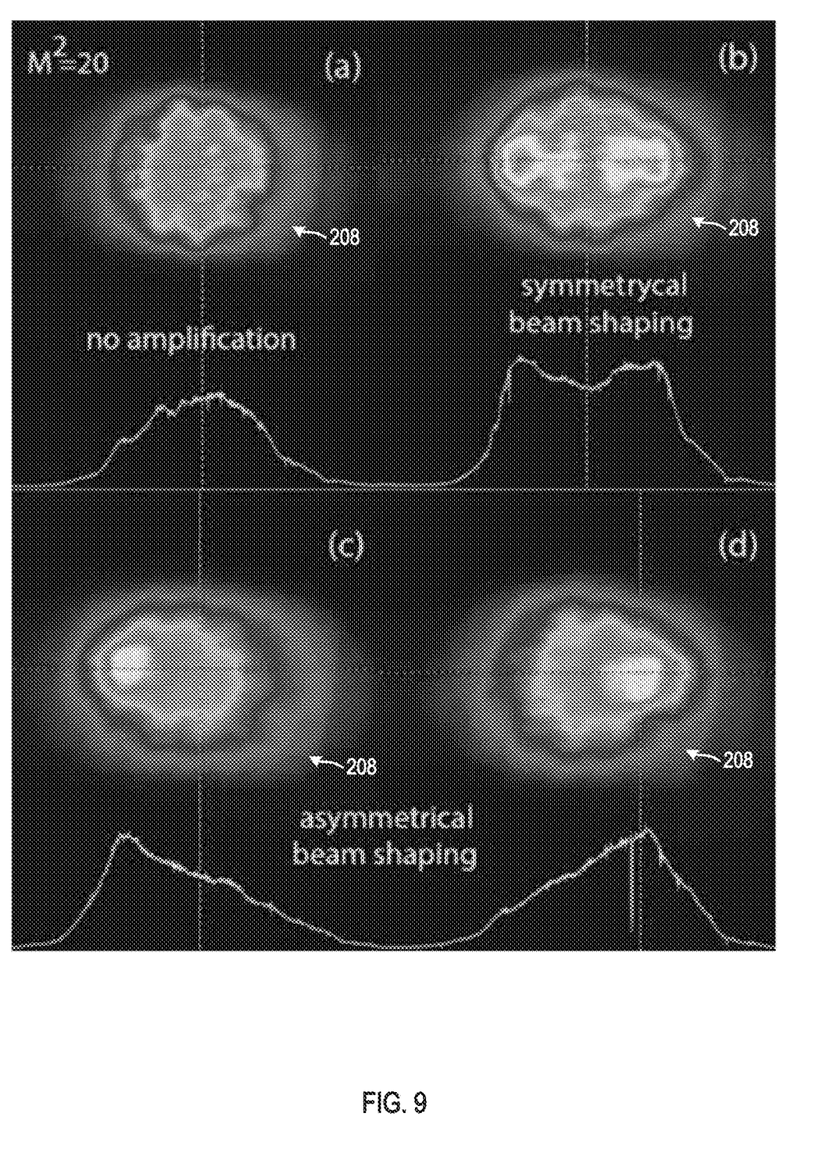
FIG. 9 shows various measured intensity profiles from an incoherent seed laser beam of an output laser beam of the laser amplifier apparatus of FIG. 1.

While the previous results relate to coherent beam shaping, the laser amplifier apparatus 100 may also be applied to incoherent beam shaping. FIG. 9 illustrates the laser amplifier apparatus 100 with an incoherent seed laser beam 206. The output laser beam 208 is still shaped and amplified in accordance with the gain profile induced by the pump laser beams 204. The experimental setup for incoherent beam shaping was the same as that for coherent beam shaping (as illustrated in FIG. 8, (panels a, b, c, d, e and f)), but for the replacement of the coherent laser emitter 106 with an incoherent one. A measured $M^2$ value of the incoherent beam was 20. The experimental results show that the proposed beam shaping technique has no limitations on the coherency of the seed laser beam 106.

Figure 10A:
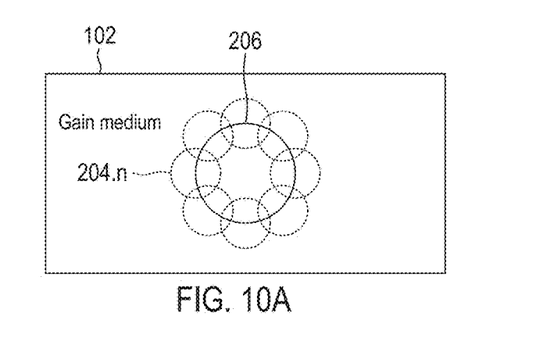
FIGS. 10A, 10B, 10C, and 10D show various alternative example seed laser beam configurations which the laser amplifier apparatus of FIG. 1 could be configured to implement, instead of the configuration of FIG. 5.
Figure 10B:
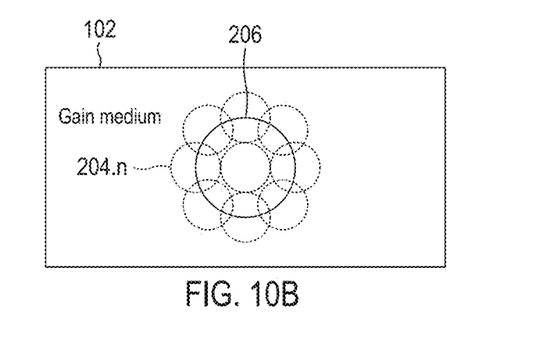
Figure 10C:
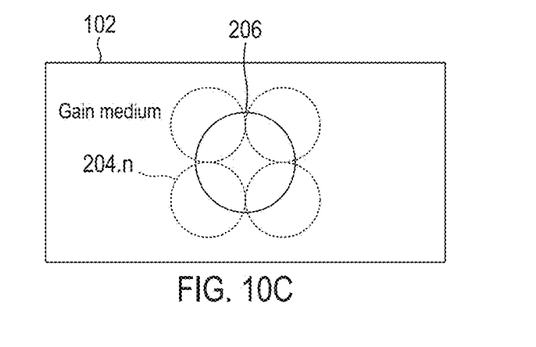

FIGS. 10A-10D show various alternative example seed laser beam configurations, to illustrate that different configurations may be practicable:

FIG. 10A: annular arrangement of seed laser beams 204.$n$ without a centre seed laser beam;

FIG. 10B: annular arrangement of seed laser beams 204.$n$ with a centre seed laser beam;

FIG. 10C: square arrangement of seed laser beams 204.$n$; and

Figure 10D:
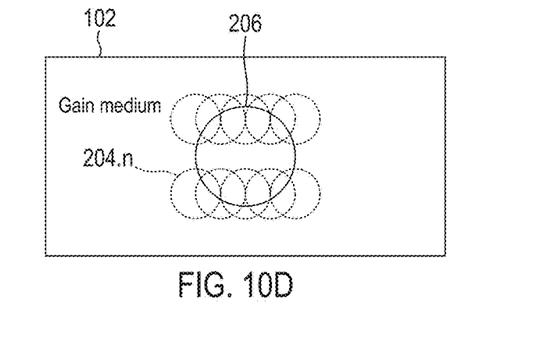

FIG. 10D: two linear arrangements of seed laser beams 204.$n$.

The Applicant notes that experimental efficiency is often relatively low but that this can be significantly improved in production versions. The obtained amplification of the experimental laser amplifier apparatus 100 was 15% of theoretical maximum. The efficiency rose with pump and seed laser beam powers increasing. Based on extrapolation of current experimental results, the Applicant believes that it is possible to reach up to 40% efficiency for higher powers of pump and seed beams. Additionally, the efficiency may be increased by placing the displaced pump laser emitter 204 closer to an optical axis of the gain medium 102 to realise a higher intensity of seed beam.

The Applicant believes that the laser amplifier apparatus 100 may have one or more of the following advantages:

High frequency capabilities: the gain profile can be varied as quickly as the pump laser emitters 104 or the gain medium 102 will allow—the electronic control of the pump laser emitters 104 is no longer a limiting factor.

High power handling capabilities: the laser amplifier apparatus 100 does not include power-sensitive SLMs or DOEs and can handle laser power in the order of Watts or kilowatts, which may make it useful in high power applications like additive manufacturing.

Insensitivity to coherent lasers: the nature of the shaping of the output laser beam 208 (by a configurable gain profile of a gain medium 102, rather than by optical elements like DOEs) means that it can which with coherent or incoherent seed laser beams 206.

Adjustable gain profile: adjusting a relative intensity of the pump laser beams 204 and/or seed laser beam 206 can change the shape of the output laser beam 208 on-the-fly.

REFERENCES

[1] Laser Beam Shaping, Theory and Techniques, ed Dickey/Holswade. (New York: Marcel Dekker, Inc., 2000).

[2] L. A. Romero, and F. M. Dickey, Lossless laser beam shaping. J. Opt. Soc. Am. A 13(4), 751-760 (1996).

[3] P. A. Bélanger and C. Parè, Optical resonators using graded-phase mirrors. Opt. Lett. 16(14), 1057-1059 (1991).

[4] J. R. Leger, D. Chen, and Z. Wang, Diffractive optical element for mode shaping of a Nd:YAG laser. Opt. Lett. 19(2), 108-110 (1994).

[5] I. V. Zhirnov, P. A. Podrabinnik, A. A. Okunkova, A. V. Gusarov, Laser beam profiling: experimental study of its influence on single-track formation by selective laser melting. Mechanics & Industry 16, 709 (2015).

[6] K. S. Hansen, F. O. Olsen, M. Kristiansen, and O. Madsen, "Beam shaping to control of weldpool size in width and depth. in Proceedings of LANE, 56, 467-476 (2014).

[7] L. Burger, I. Litvin, S. Ngcobo, and A. Forbes, Implementation of a spatial light modulator for intracavity beam shaping. J. Opt. 17, 015604 (2015).

[8] S. Ngcobo, I. Litvin, L. Burger, and A. Forbes, A digital laser for on-demand laser modes. Nat. Commun. 4, 2289 (2013).

[9] I A Litvin, G. King, G. and H. Strauss, "Beam shaping laser with controllable gain," Appl. Phys. B, 123 (2017).

The invention claimed is:

1. A controllable laser amplifier apparatus which includes:
a gain medium;
a seed laser emitter configured to generate a seed laser beam, the seed laser emitter directed toward the gain medium; and
at least two pump laser emitters configured to generate respective pump laser beams, wherein the pump laser emitters are adjustable such that respective intensities of the pump laser beams are adjustable relative to one another and/or relative to the seed laser pump, wherein the pump laser emitters are arranged such that at least one of the pump laser beams is laterally offset relative to, or not co-axial with, the seed laser beam, and wherein the pump laser beams are configured to effect a gain profile in the gain medium, the gain profile being a function of the arrangement of the pump laser emitters and the intensity of the pump laser beams,
wherein an output laser beam from the gain medium is a function of at least the gain profile and the seed laser beam.

2. The controllable laser amplifier apparatus as claimed in claim 1, wherein:
an intensity profile of the output laser beam is different from that of the seed laser beam; and
the intensity profile of the output laser beam is controllable by adjusting the pump laser emitters.

3. The controllable laser apparatus as claimed in claim 1, wherein there are more than two pump laser emitters.

4. The controllable laser apparatus as claimed in claim 1, wherein the seed laser beam is coherent and the output laser beam is also coherent.

5. The controllable laser apparatus as claimed in claim 1, wherein the seed laser beam is incoherent and the output laser beam is also incoherent.

6. The controllable laser apparatus as claimed in claim 1, wherein all of the pump laser emitters are arranged such that all of the pump laser beams are laterally offset relative to, or not co-axial with, the seed laser beam.

7. The controllable laser apparatus as claimed in claim 1, wherein at least one of the pump laser beams is co-axial with the seed laser beam, while at least one of the pump laser beams is laterally offset relative to, or not co-axial with, the seed laser beam.

8. The controllable laser apparatus as claimed in claim 1, wherein adjusting the intensities of the pump laser beams includes controlling an electrical input supplied to the pump laser emitters.

9. The controllable laser apparatus as claimed in claim 1, which includes an electronic controller configured to adjust at least the intensities of the pump laser beams.

10. The controllable laser apparatus as claimed in claim 9, wherein the electronic controller is operable to control the electrical input supplied to the pump laser emitters in micro- or nano-second time periods.

11. The controllable laser apparatus as claimed in claim 1, wherein the controller is configured to change the electrical input to the pump laser emitters at least as fast as the pump laser emitters can react.

12. The controllable laser apparatus as claimed in claim 1, wherein:
    the gain medium is a slab, bar, or elongate structure;
    the seed laser beam is directed to one side of the gain medium, while the pump laser beams may be directed to an opposite side of the gain medium; and
    the laser beam output emerges from an opposite side to the gain medium to that which the seed laser beam is directed.

13. The controllable laser apparatus as claimed in claim 1, which includes two pump laser emitters arranged such that the pump laser beams are laterally offset each side of the seed laser beam.

14. The controllable laser apparatus as claimed in claim 1, which includes one of the following configurations:
    a plurality of laser emitters arranged such that the pump laser beams are in an annular line around the seed laser beam;
    four pump laser emitters arranged such that the pump laser beams in a square formations and are equiangularly spaced around the seed laser beam; or
    a plurality of laser emitters arranged such that the pump laser beams are in two linear rows each side of the seed laser beam.

15. A method of operating a controllable laser amplifier apparatus, the method including:
    generating, by a seed laser emitter, a seed laser beam and directing the seed laser beam toward a gain medium;
    generating, by at least two pump laser emitters, respective pump laser beams, wherein the pump laser emitters are arranged such that at least one of the pump laser beams is laterally offset relative to, or not co-axial with, the seed laser beam,
    adjusting intensities of the pump laser emitters relative to one another and/or relative to the seed laser pump, wherein the pump laser beams are configured to effect a gain profile in the gain medium, the gain profile being a function of the arrangement of the pump laser emitters and the intensity of the pump laser beams, and wherein an output laser beam from the gain medium is a function of at least the gain profile and the seed laser beam.

* * * * *